United States Patent Office 3,347,865
Patented Oct. 17, 1967

3,347,865
1-HYDROCARBON-2-TERTIARY AMINO CARBO-
CYCLIC ARYL BENZ-[c,d]-INDOLES
Alfred Brack and Dieter Kutzschbach, Leverkusen, Germany, assignors to Farbenfabriken Bayer Aktiengesellschaft, Leverkusen, Germany, a corporation of Germany
No Drawing. Continuation of application Ser. No. 221,437, Sept. 5, 1962. This application May 13, 1966, Ser. No. 550,056
Claims priority, application Germany, Sept. 20, 1961, F 34,954; June 19, 1962, F 37,101, F 37,104
10 Claims. (Cl. 260—313.1)

This application is a continuation of our copending application Ser. No. 221,437, filed Sept. 5, 1962, now abandoned.

The present invention relates to novel dyestuffs; more particularly it relates to valuable basic dyestuffs and their salts of the general formula

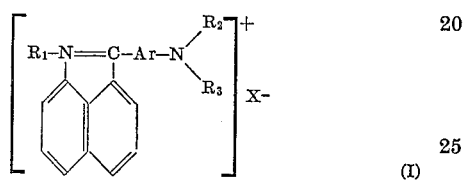

(I)

In this formula $R_1$ denotes an alkyl, cycloalkyl, aryl or aralkyl, Ar represents an aromatic residue, in particular a monocyclic or bicyclic carbocyclic residue; $R_2$ and $R_3$ stand for hydrogen, alkyl, arylalkyl, cycloalkyl or aryl, wherein the alkyl radicals may be constituents of a heterocyclic ring including the nitrogen atom to which $R_2$ and $R_3$ are attached; X stands for the residue of an acid used for salt formation of basic dyestuffs; the new dyestuffs are free of sulphonic acid and carboxylic acid groups but may contain as non-ionic substituents, for instance, halogen, alkyl, alkoxy, acyl, acylamino, dialkylamino and/or aralkylamino groups.

Dyestuffs of the Formula I can be obtained by different processes. Thus, the dyestuffs of the following constitution

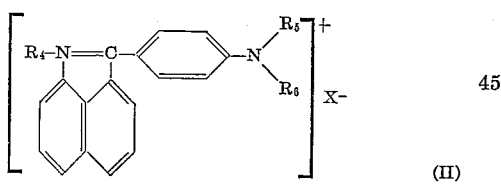

(II)

wherein $R_4$ stands for an alkyl radical, preferably for a lower alkyl radical, $R_5$ stands for hydrogen or alkyl or cycloalkyl, $R_6$ means hydrogen, alkyl or aryl residues, and werein the aromatic and aliphatic radicals are free of sulphonic acid and carboxylic acid groups but may contain non-ionic substituents; and wherein X has the above significance; are obtainable by treating dyestuffs of the formula

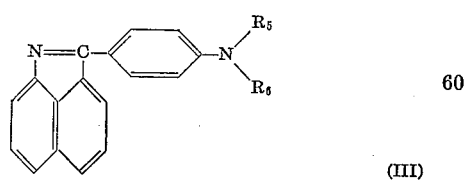

(III)

with alkylating agents.

As non-ionic substituents, the alkyl radicals may contain, for example, halogen atoms, such as chlorine, bromine and fluorine, furthermore hydroxy, alkoxy, carboxylic acid ester, carboxylic acid amide, arylazo or cyano groups, and the aromatic rings may contain the same atoms or groups as well as lower alkyl radicals and sulphonamide groups.

Suitable compounds (III) are for example the following:

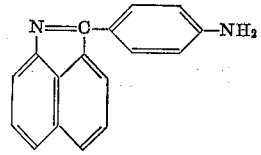

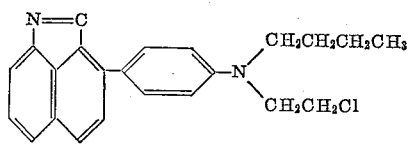

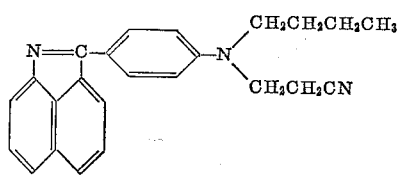

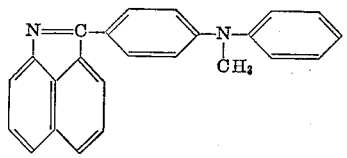

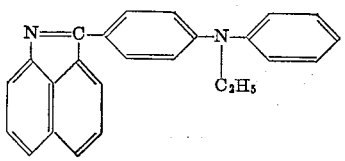

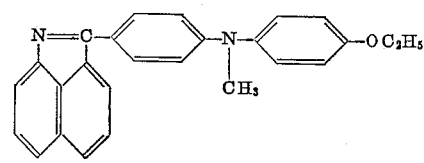

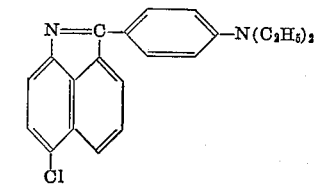

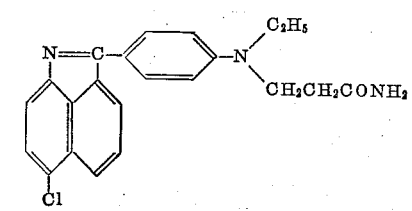

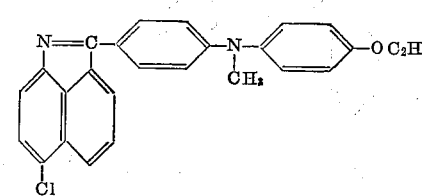

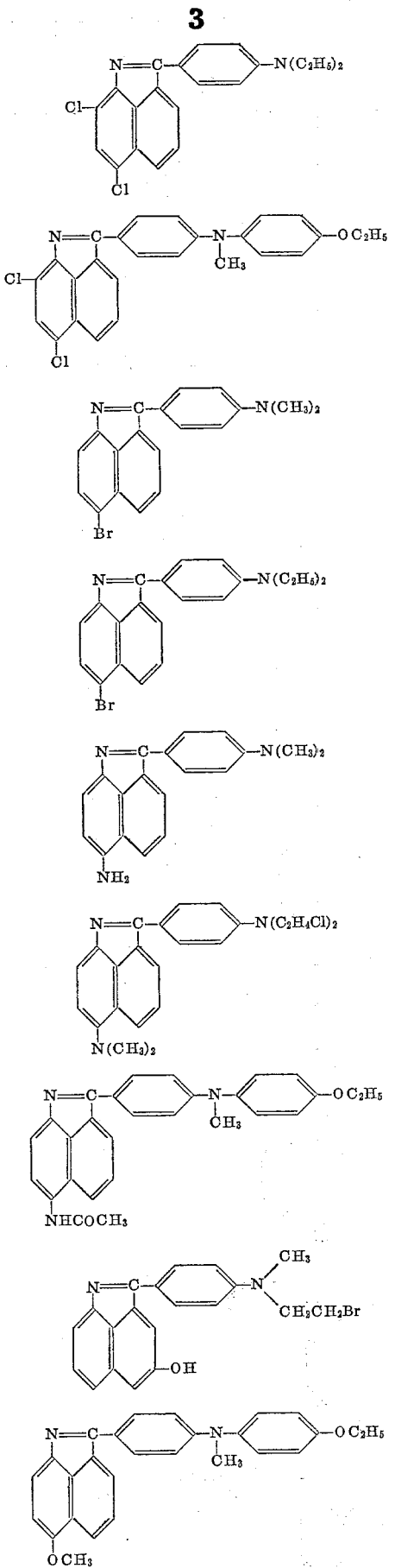

tams(1,8) are condensed with the appropriate aromatic amines in an inert solvent, for example in chlorobenzene, by means of phosphorus oxychloride or thionyl chloride, and that the bases of the condensation products, obtained in form of their salts are set free by means of alkyl.

Suitable alkylating agents are, for example, the esters of lower aliphatic alcohols and inorganic acids or sulphonic acids, as well as alkyl halides. There may be mentioned, inter alia, dimethylsulphate, diethylsulphate, benzenesulphonic acid ethyl ester, p-toluenesulphonic acid methyl ester, methyl chloride, methyl bromide, methyl iodide, ethyl chloride, ethyl bromide, ethyl iodide, n-propyl bromide, i-butyl iodide and n-butyl bromide.

It is recommended to effect the alkylation in an inert solvent or diluting agent at an elevated temperature, preferably at 80–130° C. Suitable inert solvents or diluting agents are, inter alia, benzene, toluene, chlorobenzene, dichlorobenzene, nitrobenzene, dimethyl formamide, dimethyl sulphoxide, acetone, chloroform and carbon tetrachloride. Alkylation with alkyl halides can also be carried out in alcohols, for example methanol and ethanol, optionally under pressure, and it is expedient, in this case, to use the alcohol corresponding to the alkyl halide used.

Among the new basic dyestuffs those which correspond to the general formula

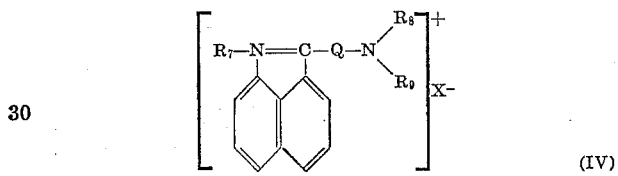

are obtainable when compounds of the general formula

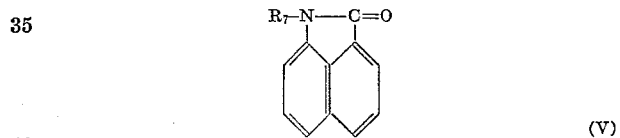

wherein $R_7$ has the below indicated meaning and in which the aromatic radicals as well as the alkyl or cycloalkyl radical may be substituted as indicated below, are heated in the presence of condensing agents having water eliminating activity, with amines of the general formula

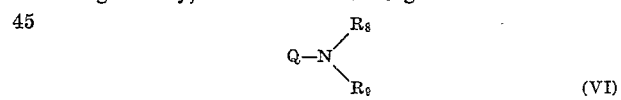

wherein Q and $R_8$ and $R_9$ have the below mentioned significance. In the above formulae $R_7$ stands for alkyl, cycloalkyl, aryl or aralkyl which residues may be substituted by halogen, alkoxy, acyl, acylamino, dialkylamino or alkylarylamino; the aromatic rings may be further substituted by alkyl and/or aryl residues; Q stands for an aromatic ring system, preferably for a radical of the phenylene or naphthylene series; $R_8$ and $R_9$ mean alkyl, cycloalkyl, aryl or aralkyl, the alkyl radicals optionally being connected with each other with the formation of a saturated heterocyclic ring including the nitrogen atom with which $R_8$ and $R_9$ are linked; Q, $R_8$ and $R_9$ may likewise contain e.g. halogen, alkoxy, acyl, dialkylamino and/or alkylarylamino substituents and the aromatic rings further alkyl or aryl groups; X has the aforementioned significance.

Examples of naphtholactams of Formula V are for instance: N-methyl-naphtholactam-1,8, N-ethylnaphtholactam-1,8, N-n-propyl-naphtholactam-1,8, N-isopropyl-naphtholactam-1,8, N-n-butyl-naphtholactam-1,8, N - isoamyl-naphtholactam - 1,8, N - cyclohexyl - naphtholactam - 1,8, N-benzyl-naphtholactam - 1,8, N - 2' - phenylethyl - naphtholactam-1,8, N-phenyl-naphtholactam - 1,8 and N - (4'-methylphenyl)-naphtholactam-1,8. These lactams are obtainable, e.g. by heating the corresponding carbamic acid chlorides in inert solvents, e.g. in di- or trichlorobenzene, in the presence of Friedel-Crafts catalysts, suitably to The production of these compounds can be carried out, for example, so that optionally substituted naphtholactemperatures beteen 130 and 180° C. The substitution products of lactams prepared according to this method, such as N-methyl-4-bromo-naphtholactam-1,8, N-ethyl-4-bromo-naphtholactam-1,8, N-ethyl-4-chloro - naphtholactam-1,8, N-ethyl-2,4-dichloro-naphtholactam-1,8, N - ethyl-4-(N',N'-bisacetylamino)-naphtholactam-1,8, N-ethyl-4-dimethylamino-naphtholactam-1,8, N - ethyl - 4 - acetyl-naphtholactam-1,8, N-(4' - methoxyphenyl) - naphtholactam-1,8, N-methyl - 2 - ethoxy - naphtholactam - 1,8, and N-ethyl-2-methoxy-naphtholactam-1,8, are also suitable as starting materials for the process according to the invention.

Suitable compounds of Formula VI are, inter alia, N,N-dimethyl-aniline, N,N-diethyl-aniline, N-n-butyl-N-β-chloroethyl-aniline, 2-ethoxy-N,N - dimethylaniline, 3-methyl-dimethyl-aniline, N-methyl-diphenylamine, N-ethyl-diphenylamine, N-methyl - 4 - ethoxy - diphenylamine, N-ethyl-4-ethoxy-diphenylamine, 1-dimethylamino-naphthalene, and 1-diethylaminonaphthalene.

As condensation agents, there are envisaged, for instance, the halides of the acids of phosphorus, such as phosphorus oxychloride, phosphorus oxybromide, phosphorus pentachloride, and phosphorus trichloride, sulphuryl and thionyl chloride, as well as phosgene, stannic chloride, titanium tetrachloride, zinc chloride, aluminum chloride, boron trifluoride, and silicon tetrachloride, or mixtures thereof.

In order to carry out the process with the use of components (V) and (VI) it is possible to proceed by heating the lactam with the amine, optionally in a diluent, to a temperature of between 70 and 150° C., and then adding the condensation agent. It is also possible first to heat the lactam with the condensation agent and subsequently to add the amine; for this method of operation, lower temperatures often suffice, for instance those between 30 and 100° C. In general, it is sufficient to add an equimolar amount of amine to the lactam, but it is also possible to employ an excess quantity, this excess being possibly chosen large enough to act as solvent. Chloroform, 1,2-dichloroethane, sym.tetrachloroethane, nitrobenzene, chlorobenzene, and the isomeric di- and trichlorobenzenes as well as phosphorus oxychloride and thionyl chloride are also suitable as diluents.

In the novel dyestuffs of Formula I X stands for the residue of an acid (anion) used for salt formation of basic dyestuffs, for example, of hydrochloric acid, sulphuric acid, phosphoric acid, or acetic acid; other acid residues may, of course, be present in the dyestuff as the salt forming anionic part of the dystuff molecule. It has to be understood that the nature of the acid residue X does not affect the dyeing properties of the dyestuffs concerned.

The novel dyestuffs are particularly suitable for dyeing, printing, and dyeing during spinning of materials which consist wholly or largely, generally more than 85%, of polymerised acrylonitrile or vinylidene cyanide. It is notable that when this process of dyeing is applied to the dyeing of mixtures of such materials with wool, the animal fibre is hardly dyed at all. A particular advantage of the dyestuffs prepared according to the invention consists in their very good colour strength, which enables the production of very deep dyeings and printings on polyacrylics. The dyeings and printings posses excellent fastnesses, particularly fastness to light, hot pressing, and washing; the dyestuffs are characterised by very good penetrating power for acrylics and yield highly brilliant shades on this material. The novel dyestuffs are furthermore suitable for dyeing and printing of tanned cotton, of cellulose esters, cellulose acetate and of paper pulps, as well as for the production of inks or of pastes for ball point pens.

Compared with the dyestuffs described in German patent specification No. 483,234 the new dyestuffs are distinguished in that the dyeings thereby obtained on polyacrylonitrile fibres show considerably improved fastness properties, especially fastness to decatising, to light or to washing.

The present invention is further concerned with compounds of the general formulae

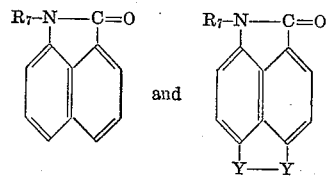

(VII)

wherein one of the two symbols Y stands for the group

the other one for the group

whilst $R_7$ stands for alkyl, cycloalkyl, aryl or aralkyl which residues may be substituted by halogen, hydroxy, acyl, acylamino, dialkylamino and/or alkylarylamino.

The compounds (VII) may serve, inter alia, as intermediates for the production of the dyestuffs for Formula I. The N-substituted peri-naphtholactams of Formula VII are obtained according to a new process by heating carbamic acid halides of the general formulae

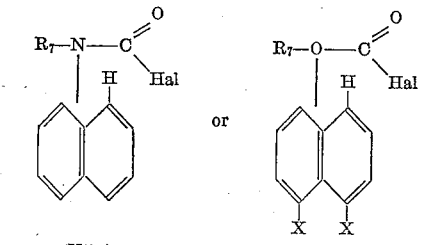

(VIII)       (IX)

in the presence of Friedel-Crafts catalysts in an inert solvent at temperatures exceeding 100° C., preferably to temperatures between 130° and 180° C.

In the general Formulae VIII and IX $R_7$ has the above significance. Hal stands for fluorine, chlorine or bromine, one of the two symbols X stands for hydrogen, the other one for the group

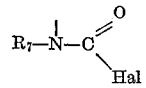

the aromatic rings as well as the alkyl and cycloalkyl radicals may be substituted by alkoxy and/or acyl groups the aromatic rings may also bear alkyl and/or aryl groups.

The carbamic acid halides used as starting materials are obtainable by known methods. Carbamic acid chlorides are especially suitable. An expedient method for the preparation of carbamic acid chlorides consists in the reaction of suitable α-naphthylamines or salts thereof, for example hydrochlorides, with phosgene in diluents, for example in di- or trichlorobenzene. Suitable naphthylamines are, for example, 1-methylaminonaphthalene,
1-ethylaminonaphthalene,
1-n-propylaminonaphthalene,
1-isopropylaminonaphthalene,
1-n-butylaminonaphthalene,
1-stearylaminonaphthalene,
1-cyclohexylaminonaphthalene,
1-benzylaminonaphthalene,
1-β-phenylethylaminonaphthalene,
1-phenylaminonaphalene,
1-p-tolylaminonaphthalene,
1-4'-ethoxyphenylaminonaphthalene,
1-methylamino-2-ethoxynaphthalene,
1-ethylamino-2-n-butoxynaphthalene,
1-ethylamino-7-methoxynaphthalene,
1-ethylamino-4-phenylsulphonylnaphthalene,
1-ethylamino-4-ethylnaphthalene,
1-ethylamino-4-chloronaphthalene, 1-ethylamino-2,4-dichloronaphthalene,
1,5-bis-methylaminonaphthalene,
1,5-bis-ethylaminonaphthalene,
1,5-bis-phenylaminonaphthalene and
1,4-bis-(4'-ethoxyphenylamino)-naphthalene.

For carrying out the process according to the invention, suitable Friedel-Crafts catalysts are preferably aluminum halides such as aluminum chloride, zinc chloride, boron fluoride and also ferric chloride, titanium tetrachloride, tin tetrachloride and antimony trichloride, as well as mixtures of Friedel-Crafts catalysts of these and other kinds. Preferred examples of inert solvents are: di- and trichlorobenzene, diphenyl, and chlorinated diphenyls alone or as mixture. It is particularly advantageous to employ these solvents already in the preparation of the carbamic acid chlorides, as it is then unnecessary to isolate the carbamic acid chlorides. The reaction is generally carried out at temperatures exceeding 100° C. The preferred range of temperature is about 130-180° C.

The process of the present invention is surprising with regard to the course of the reaction: it was to be expected than an intermolecular condensation would take place in the presence of the Friedel-Crafts catalysts, and it could not be anticipated that an intramolecular condensation would take place instead, resulting in a greatly strained ring system.

By the action of the Friedel-Crafts catalysts, it is possible that, besides the intended ring-closing reaction, further reactions also take place, such as the opening of ether linkages. Under the indicated reaction conditions alkoxy substituents possibly present may thus be converted into hydroxy groups.

The N-substituted peri-naphtholactams obtainable according to the present process are valuable products; they can be employed, among other uses, as intermediate products for the production of dyestuffs and other organic compounds.

The following examples are given for the purpose of illustrating the invention, the parts indicated are parts by weight.

*Example 1*

To a solution of 37.8 parts of the compound

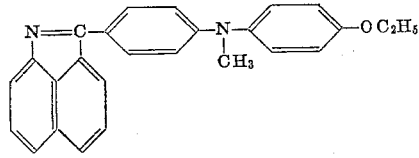

in 300 parts of dry toluene there are added dropwise at 100-105° C. 13 parts of dimethyl sulphate, the mixture is stirred for another 2 hours at 100-105° C. and is then allowed to cool down. The precipitated dyestuff is filtered off with suction and recrystallised from 1000 parts of 5% acetic acid with addition of 1-3 parts of activated carbon. The dyestuff thus obtained of the formula

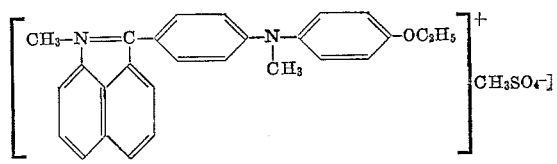

yields on polyacrylonitrile deep blue-violet dyeings and prints of excellent fastness properties.

The compound employed as starting material was prepared as follows: 169 parts of naphtholactum-(1,8) and 227 parts of 4-ethoxy-N-methyldiphenylamine are triturated with 1000 parts of chlorobenzene. 170 parts of phosphorus oxychloride are added dropwise at 90-100° C., the mixture is subsequently stirred for one hour at 100-110° C., allowed to cool down and the chlorobenzene is distilled off with steam. After pouring off the supernatent water, the residue is dissolved in 1000 parts of boiling ethanol, the solution is filtered and after cooling down rendered alkaline by addition of the required amount of 20% ethanolic potassium or sodium hydroxide solution. The precipitation of the orange-red free base is completed by dropwise addition of 1000 parts of water. After recrystallising from clclohexane the free base has a melting point of 110° C.

*Example 2*

Into a solution of 38.5 parts of the compound

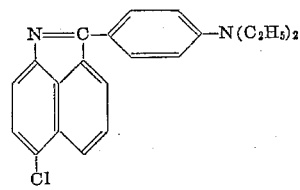

in 500 parts of toluene, there is introduced at 100-105° C. methyl chloride, until the mixture takes on a pure blue colour and a drop of the toluene solution put on paper no longer spreads with a reddish colour. The mixture is then allowed to cool down and the resulting dyestuff of the formula

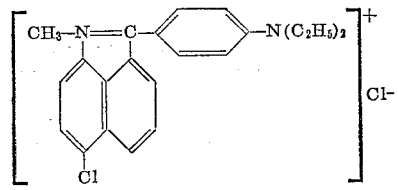

is filtered off with suction. The dyestuff gives on polyacrylonitrile fast reddish-blue dyeings and prints.

The compound serving as starting material was prepared as follows: 20.4 parts of 4-chloronaphtholactam-(1,8) and 15 parts of N,N-diethylaniline are triturated with 120 parts of chlorobenzene and 34 parts of phosphorus oxychloride are then added dropwise at 100-110° C. to the mixture. The mixture is allowed to boil for another 2 hours, then cooled to 0° C., the precipitated product of the reaction is filtered off with suction and dissolved in 350 parts of hot ethanol. 20% ethanolic potassium or sodium hydroxide solution is then added dropwise to the solution until the previously blue solution turns red. The solution is subsequently diluted with 300-500 parts of water and the precipitate is filtered off with suction. After drying and recrystallising from 500 parts of cyclohexane the compound so obtained shows a melting point of 134° C.

*Example 3*

33.5 parts of the compound indicated in Example 2 are dissolved in 100 parts of chlorobenzene and the solution is treated dropwise at 100-110° C. with 13 parts of dimethyl sulphate. After the reaction mixture has been stirred for another hour at 100-110° C., the chlorobenzene is distilled off with steam, the dyestuff solution obtained is made up with water to 1000 parts and after cooling down salted out with sodium chloride. The dyestuff of Example 2 is obtained.

*Example 4*

To a solution of 41.3 parts of the compound

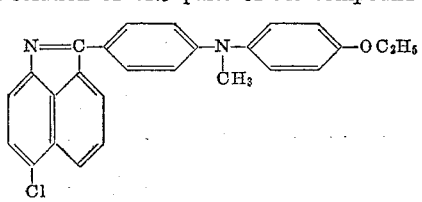

in 120 parts of dimethyl formamide there are added at 110-120° C. 18 parts of p-toluenesulphonic acid methyl ester, the mixture is stirred for 2 hours at 125-130° C., allowed to cool down, diluted with 600 parts of water and 100 parts of sodium chloride are added to it. The precipitated product is filtered off with suction and recrystallised from 2000 parts of water with addition of 1–2 parts of activated carbon. The dyestuff of the formula

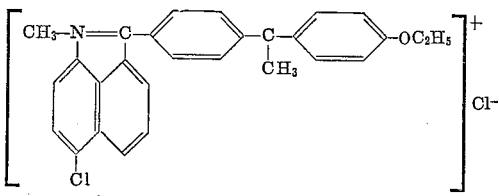

is obtained which on polyacrylonitrile gives a clear fast blue.

The compound used as starting material was prepared from 4-chloronaphtholactam-(1,8) and 4-ethoxy-N-methyl diphenylamine by the method given in paragraph 2 of Example 2; the melting point of the compound lies at 138° C.

*Example 5*

36.9 parts of the compound

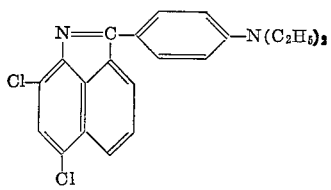

are dissolved in 300 parts of technical xylene, dried over calcium chloride, and the solution is treated dropwise at 110–115° C. with 13 parts of dimethyl sulphate. After stirring the reaction mixture for another hour at 110–115° C., it is cooled down and the precipitate formed filtered off with suction. The resultant dyestuff of the formula

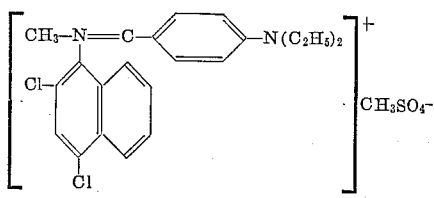

gives on polyacrylonitrile a fast blue dyeing.

The compound serving as starting material was prepared from 2,4-dichloronaphtholactam-(1,8) and diethyl aniline according to the method described in the second paragraph of Example 2; the melting point of the compound lies at 157° C.

*Example 6*

19.7 parts of N-ethyl-peri-naphtholactam and 27 parts of 4-ethoxy-N-methyl-diphenylamine are added together. 19 parts of phosphorus oxychloride are allowed dropwise into the melt at 50° C., with stirring, the mixture is stirred at 50–55° C. for 24 hours, and the resultant dyestuff paste is introduced into 2000 parts of water. When the excess of phosphorous oxychloride has been decomposed, 0.5–1 part of active charcoal is added to the solution, it is heated to 95° C., and filtered. The pH value of the filtrate is adjusted to 3–4 by the addition of sodium acetate, soda, or sodium hydroxide solution, and 50–100 parts of a saturated solution of common salt are then added dropwise, when the resultant dyestuff with the formula:

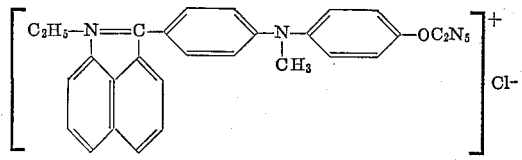

separates in crystalline form. The yield is very good.

The dyestuff produces strongly red-tinted blue dyeings and printings on fabrics from polyacrylonitrile, with excellent fastness to light.

The N-ethyl-peri-naphtholactam employed can be prepared by the following method: A solution of 23.5 parts of N-ethyl-N-1-naphthyl-carbamic acid chloride in 50 parts of 1,2-dichlorobenzene is added dropwise, with stirring, at 140–160° C. to a suspension of 26.5 parts of anhydrous aluminum chloride in 100 parts of 1,2-dichlorobenzene, and the mixture is subsequently stirred at 160° C. for another 30 minutes. After cooling, the mixture is poured onto 100 parts of ice, the aqueous layer is separated, and the organic layer is stirred with 60 parts of 20% soda solution until the dichlorobenzene layer is free from acid. After the soda solution has been separated, the dichlorobenzene is distilled off under reduced pressure. The residual crude N-ethyl-peri-naphtholactam can be readily purified by vacuum distillation or by recrystallisation from n-hexane or cyclohexane with the addition of active charcoal. It is obtained in the form of greenish yellow fluorescing crystals with melting point 68° C. The boiling point is 202–206° C. at 15 mm. Hg. The yield is almost quantitative.

*Example 7*

60 parts of anhydrous zinc chloride are added by portions at 70–80° C., with stirring, to a melt of 57 parts of N-ethyl-peri-naphtholactam and 51 parts of N,N-dimethylaniline, 30 parts of phosphorus trichloride are thereafter added dropwise, the mixture is at first stirred at 80° C. for 10–15 minutes and is thereafter diluted with 200 parts of dry benzene. After the reaction mixture has been heated to boiling for 12 hours, it is cooled down to about 50° C., it is poured into 2000 parts of water, the resultant emulsion is stirred until the phosphorus trichloride has been decomposed, and the benzene layer is separated. The aqueous dyestuff solution is heated to 90–95° C. with 0.5–2 parts of active charcoal and filtered. The resultant dyestuff separates from the filtrate on addition of common salt. This has the formula:

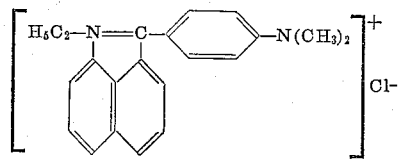

The product dyes fabrics from polyacrylonitrile or acetate rayon blue-violet.

*Example 8*

27.6 parts of x-monobromo-N-ethyl-peri-naphtholactam, 16.8 parts of phosphorus oxychloride, and 16.5 parts of N,N-diethylaniline are heated to 70° C. 9 parts of stannic chloride are added dropwise, with stirring, within about 5 minutes to the resultant melt. During this operation, care must be taken that the temperature does not rise to more than 150° C. When the melt has been stirred at 110° C. for 45 minutes, it is allowed to run into 2000 parts of water. The excess of condensation agent is decomposed; the resultant dyestuff solution is then treated with 0.2–2 parts of active charcoal, it is heated to boiling with stirring, and filtered. When 50–100 parts of a saturated solution of common salt are added dropwise, the dyestuff with the formula

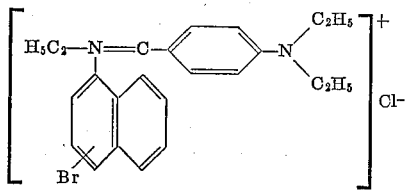

is obtained in crystalline form at a very good yield. The dyestuff produces brilliant, very fast dyeings and printings on fabrics from polyacrylonitrile.

The monobromo-N-ethyl-peri-naphtholactam employed can be prepared by the following method:

A solution of 160 parts of bromine in 300 parts of 1,2-dichlorobenzene is allowed to run at 125–130° C. into a solution of 197 parts of N-ethyl-peri-naphtholactam in 580 parts of 1,2-dichlorobenzene, the solution is stirred at 130° C. for another 15 minutes, cooled down to 60–70° C., and the solvent is distilled off at about 15 mm. Hg. It is also possible to distil the 1,2-dichlorobenzene off in steam. The residual bromolactam can readily be obtained in a pure state by recrystallisation from acetone; it melts at 116° C. The yield is almost quantitative. The exact position of the bromine atom in the naphthalene nucleus was not ascertained; most presumably it takes the para position to the N-atom.

*Example 9*

18.3 parts of N-methyl-peri-naphtholactam are warmed to 80° C. with 18.3 parts of phosphorus oxychloride during 15 minutes. 21.1 parts of N-n-butyl-N-β-chloroethylaniline are then allowed to run in at 80–90° C., with stirring, the mixture is stirred at 80° C. for one hour, and it is thereafter diluted with 50 parts of chlorobenzene which have first been heated to 80° C. When the mixture has been maintained at 80–90° C. for another 12 hours, the excess of phosphorus oxychloride is destroyed by the dropwise addition of 20 parts of water. The chlorobenzene is now distilled off in steam, and the residual aqueous dyestuff solution is filtered after the addition of 0.5 part of active charcoal. The dystuff with the formula

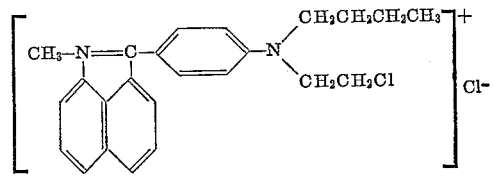

is obtained by salting out, in a good yield, and this dyes fibres of polyacrylonitrile blue-violet.

The N-methyl-peri-naphtholactam employed can be prepared in accordance with the following directions:

24 parts of 1-methylaminonaphthalene are warmed with 400 parts of 1,2,4-trichlorobenzene. The resultant solution is treated with phosogene at 150–160° C. for 2 hours. The excess of phosgene is thereafter removed by bubbling in dry air. 40.6 parts of anhydrous aluminum chloride are added by portions at 165–170° C. to the carbamic acid chloride solution thus obtained, and the solution is stirred at this temperature for another 20 minutes. It is then cooled down to about 50° C. and the mixture is poured onto 1000 parts of ice. Working up is carried out by analogy to the procedure for N-ethyl-peri-naphtholactam described in Example 6. N-methyl-peri-naphtholactam is obtained at a very good yield, and boils at 198–204° C. at 12 mm. Hg. The product recrystallised from n-hexane or cyclohexane melts at 77–78° C.

*Example 10*

28.9 parts of N-phenyl-peri-naphtholactam are melted together with 23.6 parts of N-ethyl-diphenylamine. 20 parts of phosphorus oxychloride are allowed to run at 90–100° C. into this melt, with stirring, and the mixture is stirred at this temperature for 8 hours. If the mass should become viscous, it may be diluted by the addition of another 10–20 parts of phosphorus oxychloride. After the end of the specified time, the phosphorus oxychloride is decomposed by pouring the melt into a mixture of 500–1000 parts of ice and 100 parts of aqueous saturated sodium acetate solution. The blue dyestuff separates at once. It is suitable for bulk dyeing polyacrylonitrile.

The N-phenyl-peri-naphtholactam employed can be prepared by the following method:

56 parts of N-phenyl-N-1-naphthyl-carbamic acid chloride are introduced by portions into a mixture of 70 parts of anhydrous aluminum chloride and 200 parts of 1,2-dichlorobenzene, heated to 150–170° C. The mixture is then stirred at 160–170° C. for 10–15 minutes, and subsequently cooled down to 30–50° C. 500 parts of 15% hydrochloric acid are then added dropwise during about 30 minutes, the dichlorobenzene layer is separated, and it is treated with 1–2 parts of active charcoal. After stirring for about 2 hours, the solution is filtered and the 1,2-dichlorobenzene is distilled off in vacuo. The residual crude N-phenyl-peri-naphtholactam is purified by recrystallisation from cyclohexane. The lactam forms greenish yellow crystals which melt at 110° C. The yield is good.

*Example 11*

3 parts of N-ethyl-(N′,N′-bis-acetyl) amino-perinaphtholactam are introduced into a mixture of 3 parts of 4-methoxy-N-ethyl-diphenylamine and 6 parts of phosphorus oxychloride. The mass is heated to 95–100° C. for 40 minutes, and after cooling it is poured into 100 parts of water. The strongly acidic dyestuff solution thus obtained is taken to a pH value of about 4 by the addition of sodium acetate. During this operation, a part of the dyestuff already separates. Separation is completed by the dropwise addition of a saturated solution of common salt. The crude dyestuff can be purified by recrystallisation from 100 parts of 5% acetic acid. It corresponds to the formula:

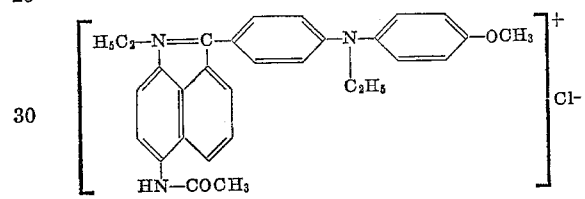

and produces red-tinted blue dyeings and printings on polyacrylonitrile materials.

The N - ethyl - (N′,N′ - bis - acetyl) - amino - peri-naphtholactam (melting point 170° C.) employed can be prepared from N-ethyl-peri-naphtholactam by nitration with nitric acid in solution in sulphuric acid, reduction of the mononitro-derivative (melting point 162–163° C.) by means of iron to give the amino-derivative (melting point 196° C.), and heating of the amino compound with excess of acetic anhydride.

*Example 12*

6 parts of N-ethyl-dimethylamino-peri-naphtholactam and 6 parts of 4-ethoxy-N-methyl-diphenylamine are heated to 80° C. with 40 parts of phosphorus oxychloride for 2 hours. When the mixture has been cooled down, the major amount of the phosphorus oxychloride is distilled off in vacuo. The residual crude dyestuff is dissolved in 300 parts of water. The pH value of the solution is adjusted to about 5 with sodium acetate, and the resultant dyestuff with the formula

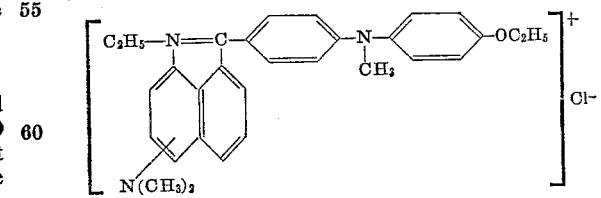

is separated by the addition of common salt. It dyes polyacrylonitrile fabrics to a green-tinted blue.

The N - ethyl - (dimethylamino) - naphtholactam employed can be prepared from ethyl-amino-naphtholactam (cf. Example 11) by methylation at 100–110° C. with dimethyl sulphate. It can be recrystallised from cyclohexane and forms orange coloured crystals with melting point 112–113° C. The position of the —N(CH$_3$)$_2$ group was not exactly determined. The —N(CH$_3$)$_2$ group is, however, most probably linked with the carbon atom in the p-position to the nitrogen atom of the naphtholactam moiety.

Example 13

59 parts of N-ethyl-peri-naphtholactam and 61.2 parts of phosphorus oxychloride are warmed to 70° C. for 45 minutes. 67 parts of N,N-diethylaniline are then allowed to drop into the melt, which is constantly stirred, the mixture is stirred at 95–100° C. for 7 hours, and it is thereafter allowed to run into 1000 parts of water. The dyestuff solution thus obtained is heated to 95° C. with 0.5–2 parts of charcoal and filtered. The resultant dyestuff is separated by the addition of 100 parts of common salt. This dyes polyacrylonitrile materials in blue-violet shades.

If in this example, the N,N-diethylaniline is replaced by an equivalent amount of 2-methoxy-N,N-dimethylaniline, 3-chloro-N,N-dimethylaniline, 3-methyl-N-n-butyl-N-$\beta$-chloroethylaniline, N-phenyl-morpholine, N-phenyl-piperidine, N-cyclohexyl-N-methylaniline, N-benzyl-N-ethylaniline, N-methyl-diphenylamine, 1-dimethylaminonaphthalene, or 1-diethylaminonaphthalene, then valuable blue-violet to blue dyestuffs are again obtained by an otherwise unaltered procedure.

If anions other than Cl⁻, normal for basic dyestuffs, are present in the dyestuff salts obtainable according to the invention, no change takes place in the dyeing properties of the dyestuffs.

Example 14

To a suspension of 26.5 parts of anhydrous aluminum chloride in 100 parts of 1,2-dichlorobenzene, a solution of 23.5 parts of N-ethyl-N-1-naphthylcarbamic acid chloride in 50 parts of 1,2-dichlorobenzene is added dropwise, with stirring, at 140–160° C. and the mixture is subsequently stirred for 30 minutes more at 160° C. After cooling, the mixture is poured onto 100 parts of ice, the aqueous layer is separated and the organic layer is stirred with 60 parts of a 20% soda solution, until the dichlorobenzene layer is free of acid. After separation of the soda solution, the dichlorobenzene is distilled off under reduced pressure. The residual crude N-ethyl-peri-naphtholactam can easily be purified by distillation under vacuum or by recrystallising from n-hexane or cyclohexane with addition of charcoal. It is thus obtained in greenish-yellow fluorescent crystals of melting point 68° C. The boiling point at 15 mm. Hg is 202–206° C. The yield is nearly quantitative.

Example 15

Phosgene is introduced at room temperature into a solution of 342 parts of 1-ethylaminonaphthalene in 1800 parts of 1,2-dichlorobenzene. Whilst stirring, the temperature of the solution is increased in the course of 15–30 minutes to 160° C. and the introduction of phosgene is continued at this temperature for 2 more hours. At the beginning of the phosgene absorption, a precipitate consisting essentially of ethylaminonaphthalene hydrochloride is formed, which is dissolved again in the course of the reaction. The course of the reaction can be controlled by determination of the hydrogen chloride formed.

After the phosgenisation is terminated, the excess of phosgene is first of all blown out by means of dry air. 1450 parts of 1,2-dichlorobenzene are then distilled off under reduced pressure. The residual solution is allowed to run, whilst stirring, into suspension of 533 parts of anhydrous aluminum chloride in 1000 parts of 1,2-dichlorobenzene at 140–160° C. The reaction being exothermic, care must be taken that the temperature does not rise above 160° C. After the mixture has been stirred for 40–50 minutes at 140° C., it is allowed to cool down to about 50° C. and poured with stirring onto 1500 parts of ice. Working up takes place according to the method of Example 14. The product of Example 1 is obtained with likewise almost quantitative yield.

Example 16

Into a suspension of 501 parts of 1-ethylaminonapthalene hydrochloride in 3000 parts of 1,2-dichlorobenzene, phosgene is introduced at 150–160° C. until everything dissolves. The introduction is then continued for another 1–1½ hours and 2500 parts of 1,2-dichlorobenzene are subsequently distilled off under reduced pressure.

The residual solution is allowed to run with stirring into a 140–160° C. suspension of 600 parts of aluminum chloride in 1000 parts of 1,2-dichlorobenzene. After the mixture has been stirred for 30 more minutes at 160° C., it is allowed to cool down and poured onto 2000 parts of ice. The organic layer is separated, stirred first with 300 parts of a 10% sodium hydroxide solution, then with 500 parts of water, and subsequently subjected to fractional distillation. The product of Example 14 is obtained with likewise nearly quantitative yield.

Example 17

24 parts of 1-methylaminonaphthalene are heated with 400 parts of 1,2,4-trichlorobenzene. The resulting solution is treated with phosgene for 2 hours at 150–160° C. The excess of phosgene is then removed by blowing in dry air. To the solution of carbamic acid chloride thus obtained, 40.6 parts of anhydrous aluminum chloride are added portionwise at 165–170° C. and the solution is stirred for 20 minutes more at this temperature. The mixture is then cooled to about 50° C. and poured onto 1000 parts of ice. The working up proceeds in a manner analogous to the method described in Example 1. N-methyl-peri-naphtholactam, boiling under 12 mm. Hg. at 198–204° C., is obtained in a very good yield. The product, when recrystalised from n-hexane or cylclohexane, melts at 77–78° C.

Example 18

56 parts of N-phenyl-N-1-naphthylcarbamic acid chloride are added portionwise to a mixture of 70 parts of anhydrous aluminum chloride and 200 parts of 1,2-dichlorobenzene at 150–170° C. The mixture is then stirred for 10–15 minutes at 160–170° C. and subsequently cooled to 30–50° C. 500 parts of 15% hydrochloric acid are added dropwise within about 30 minutes, the dichlorobenzene layer is separated and treated with 1–2 parts of activated carbon. After stirring for about 2 hours, the solutions is filtered and the 1,2-dichlorobenzene is distilled off under vacuum. The residual raw N-phenyl-perinaphtholactam is purified by recrystallising from cyclohexane. The lactam forms greenish yellow crystals which melt at 110° C. The yield is good.

Example 19

A solution of 46.8 parts of N-(4'-methylphenyl)-1-naphthylamine in 340 parts of 1,2-dichlorobenzene is heated to 115° C. While phosgene is introduced, the temperature is increased in the course of 15–20 minutes to 160° C. and phosgene is introduced into the solution at this temperature for 2 hours. After the excess of phosgene has been removed by blowing in dry air, the resultant solution of carbamic acid chloride is allowed to run with stirring into a mxture, heated to 160° C., of 70 parts of anhydrous aluminum chloride and 200 parts of 1,2-dichlorobenzene, the mixture is maintained at 160° C. for 10 more minutes and then allowed to cool down. The working up is effected in a manner analogous to the method described in Example 5. The N-(4'-methylphenyl)-perinaphtholactam obtained melts at 77° C.

By using 51.5 parts of N-(4'-ethoxyphenyl)-1-naphthylamine, instead of N - (4'-methylphenyl) - 1-naphthylamine, working by the same method, the alkoxy group is split up to give the hydroxy group and N-(4'-hydroxyphenyl)-perinaphtholactam, of melting point 252° C., is obtained.

Example 20

If in Example 12 instead of 4-ethoxy-N-methyl-diphenylamine the equivalent amount of N,N-bis-$\beta$-chloroethylaniline is used and otherwise proceeded in the same manner as indicated above, the dyestuff of the following formula

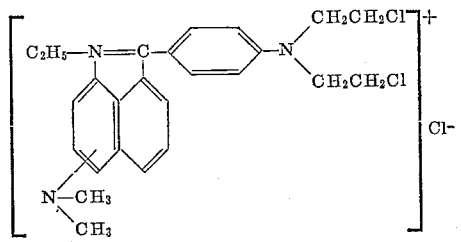

is obtained which dyes polyacrylics blue shades.

We claim:
1. A dyestuff free of sulfonic and carboxylic acid groups, said dyestuff having the formula

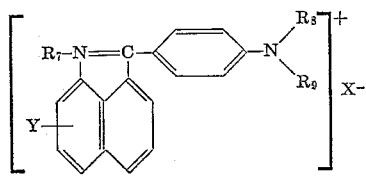

wherein $R_7$, $R_8$ and $R_9$ stand for members selected from the class consisting of methyl and ethyl, and Y stands for a member selected from the class consisting of bromine and chlorine, and $X^-$ is an anion.

2. A dyestuff free of sulfonic and carboxylic acid groups, said dyestuff having the formula

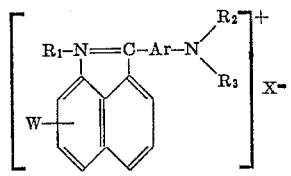

wherein $R_1$ is a member selected from the class consisting of lower alkyl, phenyl, lower alkyl-phenyl, lower alkoxy-phenyl and hydroxy phenyl, Ar is a member selected from the class consisting of 1,4-phenylene and 1,4-naphthylene, $R_2$ is a member selected from the class consisting of phenyl and lower alkoxy phenyl, $R_3$ is a member selected from the class consisting of lower alkyl and chloro lower alkyl, W is a member selected from the class consisting of hydrogen, bromo, chloro, di-lower alkylamino, lower alkoxy and acetylamino, and X is an anion.

3. A dyestuff of claim 2 wherein W is hydrogen, $R_1$ is —$C_2H_5$, Ar is p-phenylene, $R_2$ is p-ethoxy phenylene and $R_3$ is —$CH_3$.

4. The dyestuff of claim 1 of the formula

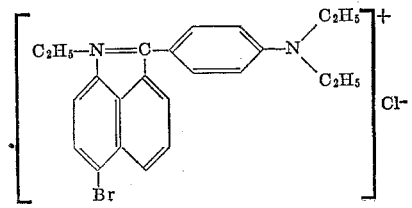

5. The dyestuff of claim 1 of the formula

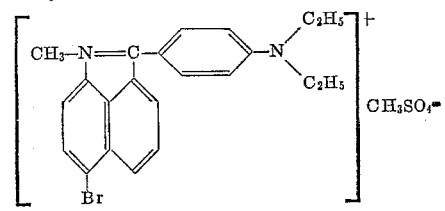

6. The dyestuff of claim 1 of the formula

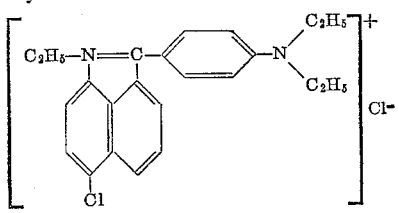

7. The dyestuff of claim 2 of the formula

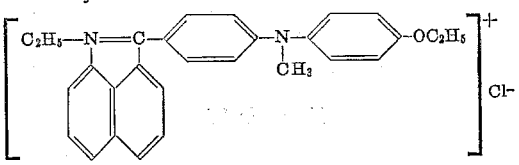

8. The dyestuff of claim 2 of the formula

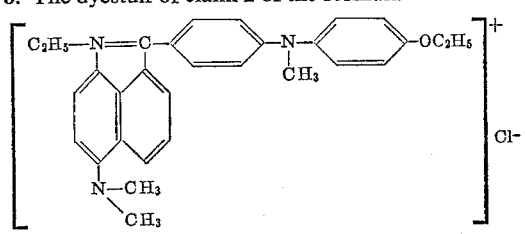

9. A dyestuff of claim 1 having the formula

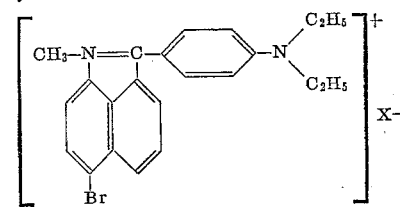

10. The dyestuff of claim 1 having the formula

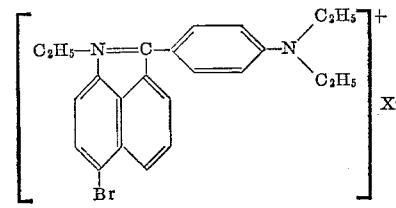

References Cited
FOREIGN PATENTS
116,643  6/1959  U.S.S.R.

ALEX MAZEL, *Primary Examiner.*
J. TOVAR, *Assistant Examiner.*